US012782733B2

(12) United States Patent
Sun

(10) Patent No.: US 12,782,733 B2
(45) Date of Patent: Nov. 3, 2026

(54) OPTICAL MODULE AND HEAD MOUNT DISPLAY

(71) Applicant: GOERTEK OPTICAL TECHNOLOGY CO., LTD., Weifang (CN)

(72) Inventor: Qi Sun, Shandong (CN)

(73) Assignee: Goertek Optical Technology Co., Ltd., Weifang (CN)

( * ) Notice: Subject to any disclaimer, the term of this patent is extended or adjusted under 35 U.S.C. 154(b) by 376 days.

(21) Appl. No.: 18/574,886

(22) PCT Filed: Dec. 9, 2021

(86) PCT No.: PCT/CN2021/136825
§ 371 (c)(1),
(2) Date: Dec. 28, 2023

(87) PCT Pub. No.: WO2023/273176
PCT Pub. Date: Jan. 5, 2023

(65) Prior Publication Data

US 2024/0302658 A1 Sep. 12, 2024

(30) Foreign Application Priority Data

Jun. 28, 2021 (CN) ......................... 202121462447.2

(51) Int. Cl.
*G02B 27/01* (2006.01)
*G02B 1/11* (2015.01)
(Continued)

(52) U.S. Cl.
CPC ....... *G02B 27/0172* (2013.01); *G02B 13/006* (2013.01); *G02B 27/286* (2013.01); *G02B 1/11* (2013.01)

(58) Field of Classification Search
CPC .......... G02B 13/008; G02B 13/14–146; G02B 5/208; G02B 27/286; G02B 13/006;
(Continued)

(56) References Cited

U.S. PATENT DOCUMENTS

2015/0205099 A1* 7/2015 Arai ...................... G02B 13/18 359/708
2017/0242258 A1* 8/2017 Edwards ........... G02B 27/0172
(Continued)

FOREIGN PATENT DOCUMENTS

CN 209496201 U * 10/2019
CN 113448100 A 9/2021
(Continued)

OTHER PUBLICATIONS

Wu, the English translation for CN-209496201-U (Year: 2019).*

*Primary Examiner* — Jonathan Y Jung
(74) *Attorney, Agent, or Firm* — Baker Botts LLP

(57) ABSTRACT

Disclosed are an optical module and a head mount display. The optical module comprises: a display configured for emitting a light for imaging display; a glued lens provided in a light-emergent direction of the display and comprising a first lens and a second lens sequentially provided along a propagation direction of an optical path; a beam-splitting element provided on a side of the first lens facing the display; a first quarter-wave plate provided between the first lens and the second lens; and a polarization-reflecting film provided between the quarter-wave plate and the second lens.

9 Claims, 6 Drawing Sheets

(51) Int. Cl.
*G02B 13/00* (2006.01)
*G02B 27/28* (2006.01)

(58) Field of Classification Search
CPC .... G02B 27/283; G02B 1/11; G02B 27/0172; G02B 27/01; G02B 27/0101; G02B 2027/0132; G02B 2027/0178
See application file for complete search history.

(56) References Cited

U.S. PATENT DOCUMENTS

| | | | | |
|---|---|---|---|---|
| 2018/0239146 | A1* | 8/2018 | Bierhuizen ........ | G02B 17/0856 |
| 2019/0025602 | A1* | 1/2019 | Qin ........................ | G02B 30/36 |
| 2020/0132994 | A1 | 4/2020 | Niu et al. | |
| 2020/0393676 | A1* | 12/2020 | Hua ..................... | G02B 3/0056 |

FOREIGN PATENT DOCUMENTS

| | | | |
|---|---|---|---|
| CN | 214751119 | U | 11/2021 |
| CN | 112596240 | B | 9/2022 |

* cited by examiner

OPTICAL MODULE AND HEAD MOUNT DISPLAY

CROSS-REFERENCE TO RELATED APPLICATIONS

The present disclosure is a National Stage of International Application No. PCT/CN2021/136825, filed on Dec. 9, 2021, which claims priority to claims priority to Chinese patent application No. 202121462447.2, filed on Jun. 28, 2021, the entireties of which are incorporated herein by reference.

TECHNICAL FIELD

The present disclosure relates to the field of optical display technologies, and in particular to an optical module and a head mount display.

BACKGROUND

With the development and upgrading of advanced optical design and processing technology, display technology and processors, Virtual Reality (VR) products are emerging in an endless variety of forms and types, and their application areas are becoming more and more extensive. The main working principle of the virtual reality products is that the image displayed by the display is transmitted and enlarged through an optical lens, and then its image is received by a human eye, which observes the enlarged virtual image. The image requires a long enough light path for enlargement, so the optical system is long in total optical length, which causes the head mount display to be large in size and inconvenient for a user to wear.

SUMMARY

Based on the above, aiming at the problem that the optical system in the existing head mount display is long in total optical length such that the head mount display is large in size and inconvenient for a user to wear, there is a need to provide an optical module and a head mount display intended to be able to reduce the total optical length of the optical system, reduce the size of the head mount display, and facilitate wearing by a user.

In order to achieve the above purpose, the application provides an optical module, which comprises:

- a display configured for emitting a light for imaging display;
- a glued lens provided in a light-emergent direction of the display and comprising a first lens and a second lens sequentially provided along a propagation direction of an optical path, the first lens having a first surface facing the display and a second surface facing away from the display, the second lens having a third surface facing the display and a fourth surface facing away from the display, the second surface and the third surface being planar and glued to each other, and the fourth surface being convex in a direction facing away from the display;
- a beam-splitting element provided on a side of the first lens facing the display;
- a first quarter-wave plate provided between the first lens and the second lens; and
- a polarization-reflecting film provided between the quarter-wave plate and the second lens;
- defining a pixel size of the display as P and a beam diameter of the optical module at a full field of view as D respectively, satisfying: $D<2P$.

Optionally, the optical module further comprises a polarizing film provided on a side of the first lens facing away from the display.

Optionally, the polarizing film is provided between the polarization-reflecting film and the second lens, and the first quarter-wave plate, the polarization-reflecting film, and the polarizing film are combined into one integral film layer.

Optionally, the optical module further comprises a second quarter-wave plate provided on a side of the polarization-reflecting film facing away from the display.

Optionally, the second quarter-wave plate is provided between the polarization-reflecting film and the second lens;

or, the second quarter-wave plate is provided on the fourth surface of the second lens.

Optionally, the first surface is convex toward the display.

Optionally, the optical module further comprises an anti-reflection film provided on the fourth surface.

Optionally, the first lens has a center thickness of T1, the second lens has a center thickness of T2, and a distance between the first surface and a light-emergent surface of the display is L, satisfying:

$$4\text{ mm}<T1<8\text{ mm},\ 3\text{ mm}<T2<5\text{ mm},\ 10\text{ mm}<L<15\text{ mm}.$$

Optionally, the first surface has a radius value of R1, the first surface has a conic constant of C1, the fourth surface has a radius value of R4, and the fourth surface has a conic constant of C4, satisfying:

$$60\text{ mm}<R1<100\text{ mm},C1<10;$$

$$120\text{ mm}<R4<200\text{ mm},C4<10.$$

In addition, in order to solve the above problem, the present disclosure also provides a head mount display comprising a housing and the optical module as above, wherein the optical module is provided in the housing and has an overall optical length of TTL which satisfies: $TTL<25$ mm.

In the technical solution proposed in the present embodiment, the display emits light, and the emitted light is circularly polarized light. As the light is emitted to the glued lens, it first passes by the beam-splitting element, with a portion of the light being transmitted through the beam-splitting element and another portion of the light being reflected. The light transmitted through the beam-splitting element continues to transmit to the first quarter-wave plate, the polarization state of the circularly polarized light being changed from the circularly polarized light to the linearly polarized light. When the linearly polarized light is emitted to the polarization-reflecting film, the vibration direction of the linearly polarized light is different from the transmission direction of the polarization-reflecting film, and the light is reflected. The reflected light passes by the first quarter-wave plate and the beam-splitting element in turn, and when the light passes by the beam-splitting element again, the light is partially reflected toward the glued lens. The light at this point is circularly polarized light, and the light changes in the handedness after reflection. After the light passes by the first quarter-wave plate again, it is converted into linearly polarized light again, the polarization direction of which at this point is the same as the transmission direction of the polarization-reflecting film. The light is transmitted through the glued lens set and is imaged at the location of the human eye. As can be seen, the light is refracted and reflected as it passes by the glued lens, and in the process, the light is continuously enlarged and transmitted, which allows the image to be enlarged and transmitted in a limited space, thus facilitating a reduction in the total optical length. In addition, by planar gluing of the second surface and the third surface, it is possible to further reduce the overall volume. Further, the fourth surface of the second lens is convex in a direction facing away from the display, therefore it is possible to converge the light and thereby reduce the total optical length of the overall system, reducing the size of the head mount display and facilitating wearing by a user. Moreover, the present embodiment improves the imaging quality by having the light diameter less than twice the pixel size at the full field of view, and improves clarity of the imaging.

BRIEF DESCRIPTION OF THE DRAWINGS

In order to clearly illustrate embodiments of the present disclosure or technical solutions in the prior art, accompanying drawings that need to be used in description of the embodiments or the prior art will be briefly introduced as follows. Obviously, drawings in following description are only the embodiments of the present disclosure. For those skilled in the art, other drawings can also be obtained according to the disclosed drawings without creative efforts.

DESCRIPTION OF REFERENCE SIGNS

Figure 1:
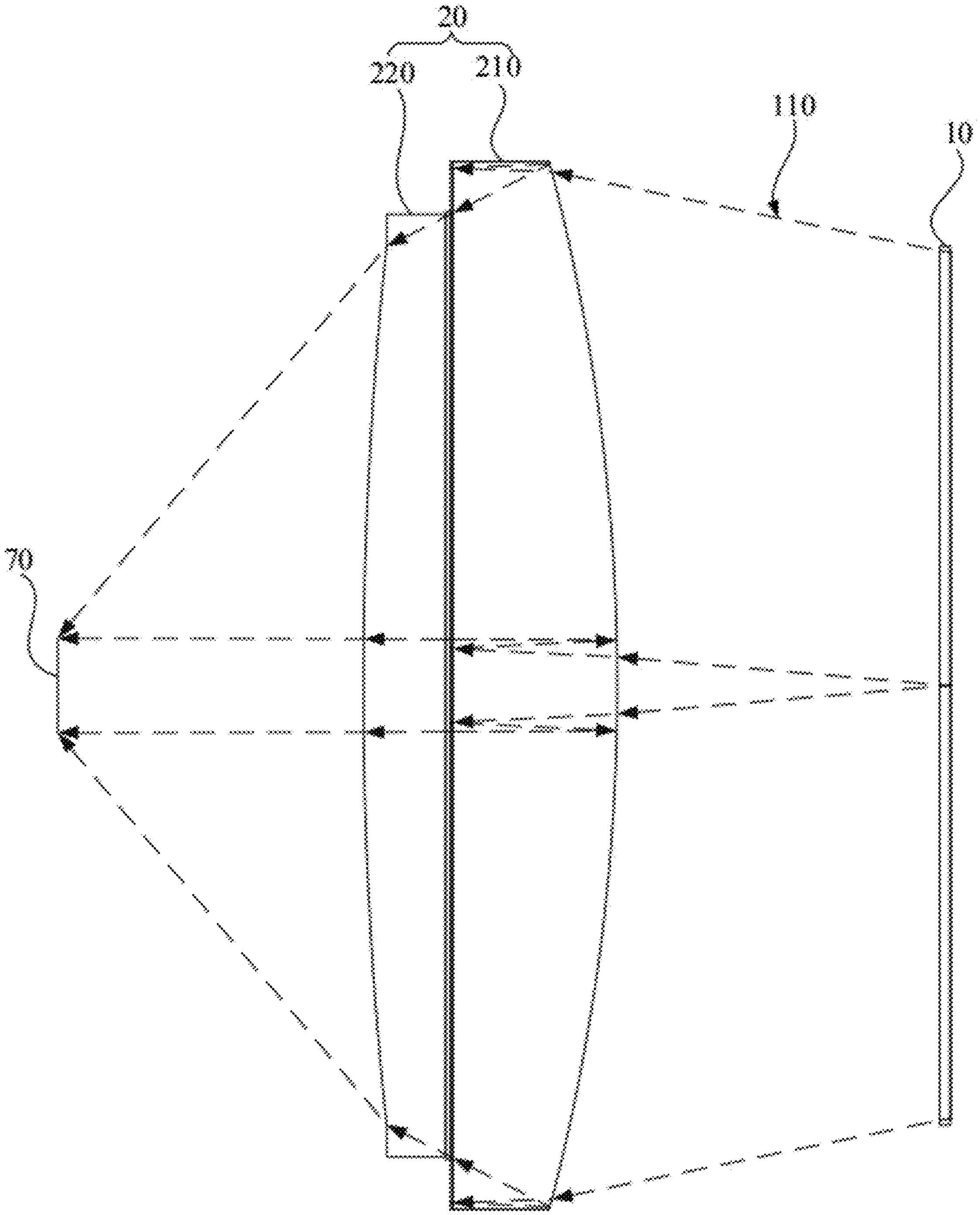
FIG. 1 shows a schematic structural illustration of an optical module in an embodiment of the present disclosure.

| | | | |
|---|---|---|---|
| 10 | display | 221 | third surface |
| 110 | beam | 222 | fourth surface |
| 20 | glued lens | 30 | beam-splitting element |
| 210 | first lens | 40 | first quarter-wave plate |
| 211 | first surface | 50 | polarization-reflecting film |
| 212 | second surface | 60 | polarizing film |
| 220 | second lens | 70 | human eye |

The realization of the objects, functional features and advantages of the present disclosure will be further described in connection with the embodiments, with reference to the accompanying drawings.

DETAILED DESCRIPTION

Technical solutions in the embodiments of the present disclosure are described below with reference to the accompanying drawings in the embodiments of the present disclosure. Apparently, the described embodiments are merely some rather than all of the embodiments of the present disclosure. All other embodiments, acquired by those of ordinary skill in the art based on the embodiments of the present disclosure without any creative work, should fall into the protection scope of the present disclosure.

It should be noted that all directional indications (such as up, down, left, right, front, back . . . ) in the embodiment of the present disclosure are used only to explain the relative positional relationship, movement, etc., between the parts in a particular attitude (as shown in the accompanying drawings), and the directional indications are changed accordingly if that particular attitude is changed.

In addition, terms "first" and "second" involved in the present disclosure are only used for descriptive purposes and should not be understood as indicating or implying relative importance or implying a number of indicated technical features. Therefore, a feature delimited with "first", "second" may expressly or implicitly include at least one of those features. In a description of the present disclosure, "a plurality" means at least two, such as two, three, etc., unless expressly and specifically defined otherwise.

In the present disclosure, unless expressly specified and limited otherwise, terms "connected", "fixed" and other terms should be interpreted in a broad sense, for example, it can be a fixed connection, a detachable connection, or an integrated; it can be a mechanical connection or an electrical connection; it can be directly connected, or indirectly connected through an intermediate medium, and it can be an internal communication between two elements or an interaction relationship between the two elements, unless otherwise explicitly defined. For those of ordinary skill in the art, specific meanings of the above terms in the present disclosure can be understood according to specific situations.

In addition, the technical solutions between the various embodiments of the present disclosure may be combined with each other, but it must be based on the fact that it can be realized by a person of ordinary skill in the art. When the combination of technical solutions appears to be contradictory or unattainable, it should be considered that such combination of technical solutions does not exist and is not within the scope of protection claimed in the present disclosure.

There are also various display principles of head mount display, for example, in addition to VR display, it also comprises AR (Augmented Reality) display. These images displayed by the head mount display need to be transmitted and enlarged through an optical lens, and in the process of enlarging the images, sufficient space is required for the transmission of the light such that the optical system is long in total optical length, causing the head mount display to be large in size and inconvenient for a user to wear.

Figure 2:
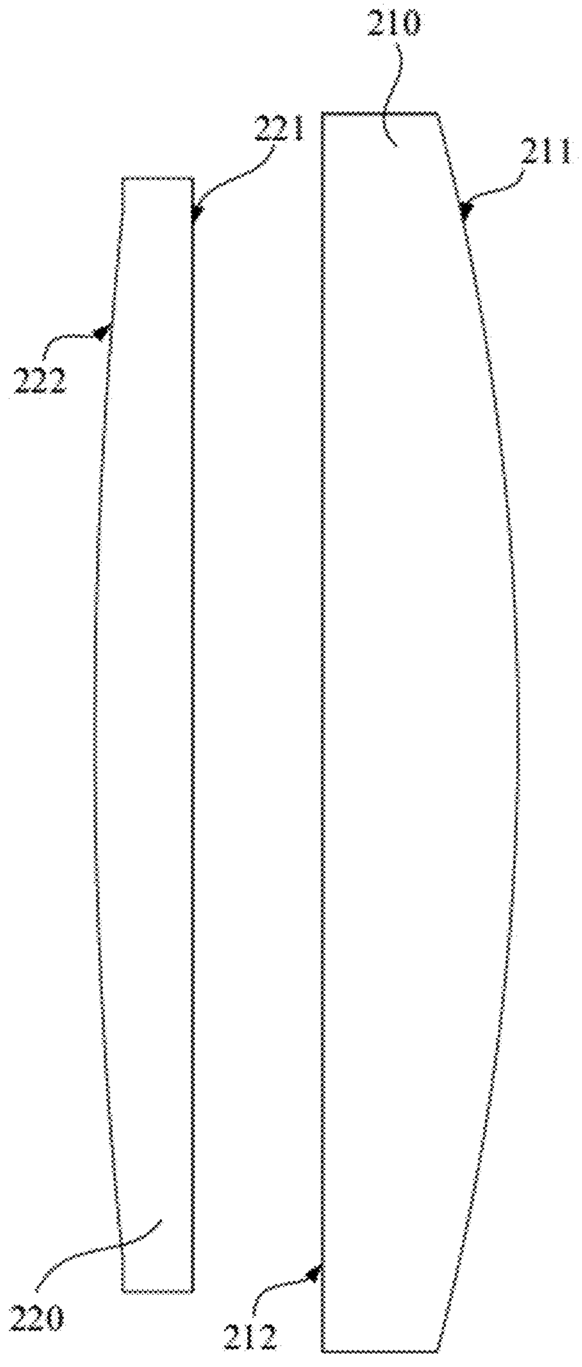
FIG. 2 shows a schematic structural illustration of a first lens and a second lens of the optical module of FIG. 1.
Figure 3:
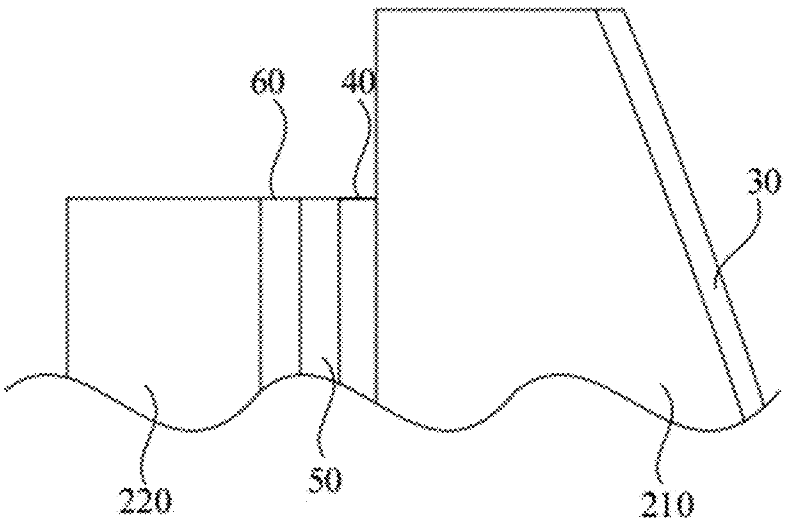
FIG. 3 shows a schematic structural illustration of a first quarter-wave plate, a polarization-reflecting film and a polarizing film of the optical module in another embodiment of the present disclosure.

In order to solve the above problem, referring to FIGS. 1 to 3, the present disclosure provides an optical module. The optical module comprises: a display 10, a glued lens 20, a beam-splitting element 30, a first quarter-wave plate 40 and a polarization-reflecting film 50. The display 10 emits a light 110 for imaging display; the glued lens 20 is provided in the light-emergent direction of the display 10; the beam-splitting element 30, the first quarter-wave plate 40, and the polarization-reflecting film 50 are sequentially provided along the propagation direction of the light 110. The light 110 exiting through the display 10 has a circular polarization state.

Here, the glued lens 20 comprises a first lens 210 and a second lens 220 sequentially provided along the propagation direction of the optical path. The first lens 210 has a first surface 211 facing the display 10 and a second surface 212 facing away from the display 10. The second lens 220 has a third surface 221 facing the display 10 and a fourth surface 222 facing away from the display 10. The second surface 212 and the third surface 221 are planar and glued to each other. The fourth surface 222 is convex in a direction facing away from the display 10. The first lens 210 and the second lens 220 are glued together by the planar gluing of the second surface 212 and the third surface 221, which can further reduce the overall volume of the lens. In addition, the plane is easier to process, which is beneficial to reducing the cost. Meanwhile, the docking of the first lens 210 and the second lens 220 is simpler and easier to operate, thereby facilitating the improvement of the gluing efficiency.

The beam-splitting element 30 is provided on the side of the first lens 210 facing the display 10; the beam-splitting element 30 serves to split the beam, i.e., to allow one portion of the light 110 to transmit and another portion of the light 110 to reflect, such as a transflective film. It is also possible for the light 110 in one state to transmit and for the light 110 in another state to reflect, such as a polarization-reflecting film 50 with a transmission axis. When the polarization state of the light 110 is in the same direction as the transmission axis, the light 110 is transmitted, and when the polarization state of the light 110 is not in the same direction as the transmission axis, the light 110 is absorbed or reflected.

The first quarter-wave plate 40 is provided between the first lens 210 and the second lens 220; the first quarter-wave plate 40 is used to convert the polarization state of the light 110, for example, from linearly polarized light to circularly polarized light, or from circularly polarized light to linearly polarized light. The polarization-reflecting film 50 is provided between the quarter-wave plate and the second lens 220. The polarization-reflecting film 50 has a polarized transmission direction, which may also be understood as a transmission axis. When the polarization state of the light 110 is in the same direction as the transmission axis, the light 110 is transmitted, and when the polarization state of the light 110 is not in the same direction as the transmission axis, the light 110 is reflected. The beam-splitting element 30, the first quarter-wave plate 40, and the polarization-reflecting film 50 may be independent optical devices, or may be a film structure. If it is a film structure, it can be set by pasting or coating. Defining a pixel size of the display as P and a beam diameter of the optical module at a full field of view as D respectively, satisfying: $D<2P$. In short, the beam diameter at the full field of view is less than twice the pixel size. The smaller the beam diameter, the higher the imaging quality. For example, if the pixel size P is 24 μm, the beam diameter D at the full field of view is less than 48 μm. For example, the beam diameter may also be 15 μm, 20.0 μm, 25.0 μm, 30.0 μm, 35.0 μm, 40.0 μm, etc., or other values less than 48 μm. Of course, it should be pointed out that the size of the beam diameter varies with the pixel size, and as long as the beam diameter is less than twice the pixel size at the full field of view, it is within the protection scope of the present solution.

In the technical solution proposed in the present embodiment, the display 10 emits the light 110, and the emitted light 110 is circularly polarized light. As the light 110 is emitted to the glued lens 20, it first passes by the beam-splitting element 30, with a portion of the light 110 being transmitted through the beam-splitting element 30 and another portion of the light 110 being reflected. The light 110 transmitted through the beam-splitting element 30 continues to the first quarter-wave plate 40, the polarization state of the circularly polarized light 110 is changed from the circularly polarized light to the linearly polarized light. When the linearly polarized light 110 is emitted to the polarization-reflecting film 50, the vibration direction of the linearly polarized light is different from the transmission direction of the polarization-reflecting film 50, and the light 110 is reflected. The reflected light 110 passes by the first quarter-wave plate 40 and the beam-splitting element 30 in turn, and when the light 110 passes by the beam-splitting element 30 again, the light 110 is partially reflected toward the glued lens 20. The light 110 at this point is circularly polarized light, and the light 110 changes in the handedness after reflection. After the light 110 passes by the first quarter-wave plate 40 again, it is converted into linearly polarized light again, the polarization direction of which at this point is the same as the transmission direction of the polarization-reflecting film 50. The light 110 is transmitted through the glued lens set and is imaged at the location of the human eye 70. As can be seen, the light 110 is refracted and reflected as it passes by the glued lens 20, and in the process, the light 110 is continuously enlarged and transmitted, which allows the image to be enlarged and transmitted in a limited space, thus facilitating a reduction in the total optical length. In addition, by planar gluing of the second surface 212 and the third surface 221, it is possible to further reduce the overall volume. Further, the fourth surface 222 of the second lens 220 is convex in a direction facing away from the display 10. As such, it is possible to converge the light 110 and thereby reduce the total optical length of the overall system, thereby reducing the size of the head mount display and facilitating wearing by a user. Moreover, the present embodiment improves the imaging quality by having the light diameter less than twice the pixel size at the full field of view, resulting in clearer imaging.

In addition, it should be pointed out that through the glued arrangement of the first lens 210 and the second lens 220, it is possible to reduce the amount of air that the light 110 passes by when it passes by the glued lens set, thereby reducing ghosting and stray light that is formed as the light 110 passes by mediums with different refractive indexes.

Further, the first lens 210 and the second lens 220 may be made of optical glass, which can ensure imaging quality. Furthermore, the first lens 210 and the second lens 220 may be made of optical plastic in order to reduce the weight and the manufacturing cost. For example, the first lens 210 is a COC (Cycloalkene Copolymer) material, and the second lens 220 is a COP (Cyclo Olefin Polymer) cycloolefin polymer material. Wherein, the light 110 is refracted and reflected within the first lens 210, the COC material can withstand higher stress, the light 110 is directly transmitted through the second lens 220, and the COP material has lower stress requirements. In addition, the first lens 210 and the second lens 220 may be made of OKP or PMMA (methyl methacrylate).

In the above embodiment, during the propagation of the light 110, it is possible that the vibration direction of a portion of the linearly polarized light forms an angle with the transmission direction of the polarization-reflecting film 50 ranging from 0° to 90°, that is, the vibration direction of the portion of the linearly polarized light is neither the same as nor perpendicular to the transmission direction of the polarization-reflecting film 50. In this way, stray light will appear after the light 110 passes by the polarization-reflecting film 50. In order to reduce stray light, the optical module further comprises a polarizing film 60 provided on a side of the first lens 210 facing away from the display 10. The polarizing film 60 has a transmission direction which is the same as the transmission direction of the polarization-reflecting film 50. The polarizing film 60 filters the passing light 110, and the light 110 in a transmission direction different from that of the polarizing film 60 will be filtered and absorbed, so as to ensure that the light 110 passing through the optical module can maintain a consistent vibration direction with that of the polarizing film 60 to reduce the occurrence of stray light.

In the above embodiment, in order to facilitate assembly of the optical module, the polarizing film 60 is provided between the polarization-reflecting film 50 and the second lens 220, and the first quarter-wave plate 40, the polarization-reflecting film 50, and the polarizing film 60 are combined into one integral film layer. With the one integral film layer structure, it is possible to compress the thickness of the film layer and reduce the optical glued layer between each layer. At the same time, it is possible to complete the installation of three layers by applying the one integral film layer. When applying the integral film layer, an optical glued layer is provided on the surface of the quarter-wave plate facing the first lens 210 and on the surface of the polarizing film 60 facing the second lens 220, with the aid of which the integral film layer is fixed.

In another embodiment of the present disclosure, the light 110 passing through the polarization-reflecting film 50 is linearly polarized light, and when the human eye 70 views the linearly polarized light, the imaging quality is poor. For this purpose, the optical module further comprises a second quarter-wave plate provided on a side of the polarization-reflecting film 50 facing away from the display 10. By converting the linearly polarized light into circularly polarized light with the second quarter-wave plate, it is possible to ensure that the light 110 received by the human eye 70 is circularly polarized, thereby improving the imaging quality.

Further, the setting position of the second quarter-wave plate comprises two kinds. In the first setting position, the second quarter-wave plate is provided between the polarization-reflecting film 50 and the second lens 220; as such, the second quarter-wave plate is provided between the first lens 210 and the second lens 220, and may be protected by these lenses. The second quarter-wave plate, the polarization-reflecting film 50, and the first quarter-wave plate 40 form a three-in-one integral film structure. If the polarizing film 60 is provided, alternatively, the second quarter-wave plate, the polarizing film 60, the polarization-reflecting film 50, and the first quarter-wave plate 40 may form a four-in-one integral film structure. At this time, the second quarter-wave plate is attached to the third surface 221 of the second lens 220.

In another setting position, the second quarter-wave plate is provided on the fourth surface 222 of the second lens 220. After passing over the fourth surface 222 of the second lens 220, the light 110 is imaged at the location of the human eye 70. In this way, it can be seen that the second quarter-wave plate is set facing the user.

In one embodiment of the present disclosure, in order to further shorten the total optical length, the first surface 211 is convex toward the display 10. Through the bulge of the first surface 211 and that of the fourth surface 222, the glued lens 20 can form a biconvex lens as a whole. In this way, it is possible to further shorten the focused imaging position of the light 110 and reduce the total optical length of the whole system. It should be noted that both the first lens 210 and the second lens 220 are plano-convex lenses.

In an embodiment of the present disclosure, in order to improve the transmittance of the light 110, the optical module further comprises an anti-reflection film provided on the fourth surface 222. The anti-reflection film increases the number of beams 110 passing through, and reduces the reflection and absorption of the light 110 by the lens. In addition, the anti-reflection film can be set in a pasting mode or a coating mode, and the pasting mode is simple and convenient to operate. The coating mode can improve firmness of the film layer of the anti-reflection film.

In an embodiment of the present disclosure, the first lens 210 has a center thickness of T1, the second lens 220 has a center thickness of T2, and the distance between the first surface 211 and the light-emergent surface of the display 10 is L, satisfying:

$4\ mm<T1<8\ mm$, $3\ mm<T2<5\ mm$, $10\ mm<L<15\ mm$. Wherein, L is the distance between the two closest points between the first surface 211 and the light-emergent surface of the display 10. If T1 is less than 4 mm, the first lens 210 is too thin, and if T1 is greater than 8 mm, the first lens 210 is too thick, which increases the overall volume of the optical module. In addition, if the first lens 210 is too thin or too thick, the imaging quality may be degraded. Likewise, if T2 is less than 3 mm, the second lens 220 is too thin; if T2 is greater than 5 mm, the second lens 220 is too thick, which may increase the overall volume of the optical module, and if the second lens 220 is too thin or too thick, the imaging quality may also be degraded. If L is less than 10 mm, the distance between the first lens 210 and the display 10 is too close, making it difficult for the light 110 to obtain a sufficient optical path, thereby degrading the imaging quality. If L is greater than 15 mm, the first lens 210 and the display 10 are too far apart, which increases the overall volume of the optical module.

In an embodiment of the present disclosure, the first surface 211 has a radius value of R1, the first surface 211 has a conic constant of C1, the fourth surface 222 has a radius value of R4, and the fourth surface 222 has a conic constant of C4, satisfying:

$60\ mm<R1<100\ mm$, $C1<10$; $120\ mm<R4<200\ mm$, $C4<10$; the above parameters can be flexibly selected within a corresponding range to ensure the imaging quality. If the parameters are selected out of the corresponding range, the imaging quality will be easily degraded.

Figure 4:
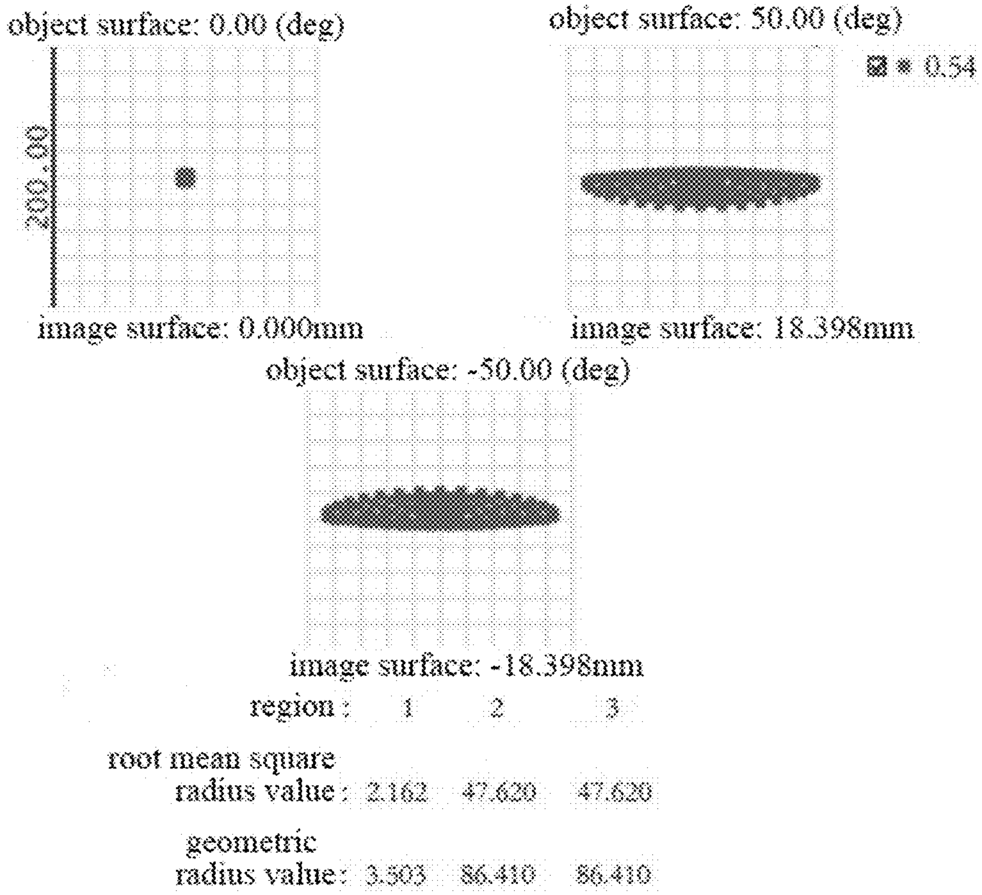
FIG. 4 shows a spot diagram of the optical module of FIG. 1.
Figure 5:
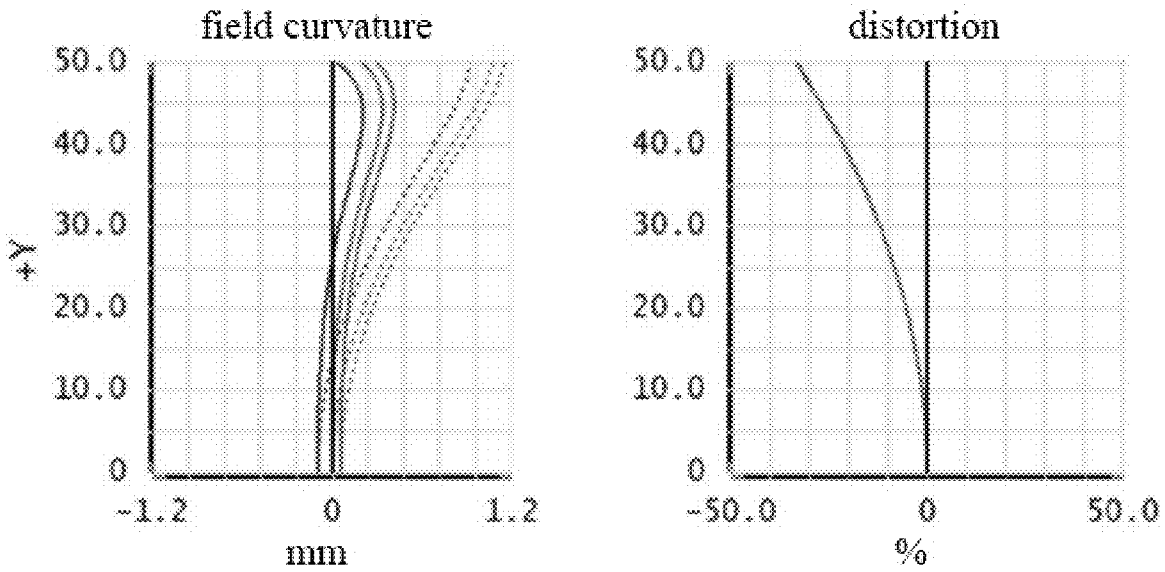
FIG. 5 shows a field curvature and a distortion image of the optical module of FIG. 1.
Figure 6:
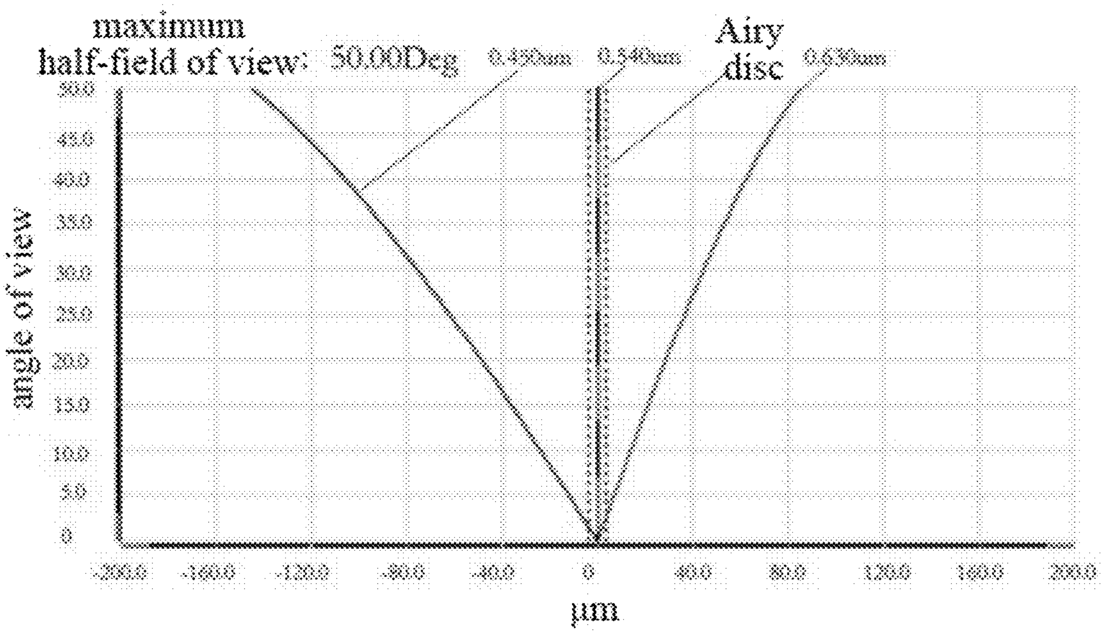
FIG. 6 shows a chromatic distortion image of the optical module of FIG. 1.

Referring to FIGS. 4-FIG. 6, in the case that second surface 212 and the third surface 221 are planar, the imaging spot is less than 48 μm, the field curvature is less than 1.2 mm, distortion at the maximum field of view position is less than 33.5% and the maximum dispersion value is less than 229.7 μm. It can be seen from the above parameters that the optical module meets the design requirements and ensures that the user can obtain an image with high definition.

The present disclosure also provides a head mount display comprising a housing and the optical module as above, wherein the optical module is provided in the housing and has an overall optical length of TTL which satisfies: $TTL<25$ mm. For example, $TTL=24.6$ mm. It can be seen that the optical module has an overall optical length of less than 25 mm. Based on the design of the optical module described above, the focal length of the optical module may be 23.2 mm, the focal length of the first lens 210 is 154.2 mm, and the focal length of the second lens 220 is 319.1 mm. The size of the light-emergent surface of the display 10 is 2.1 inches, and the size of each pixel is 24 μm. The imaging angle of view is 100° to 105°, e.g., 100°, within which the user can observe a clear image.

The design results of one of the embodiments refer to Table 1 and Table 2, which respectively list the optical surface number (Surface) numbered sequentially from human eye (STOP) to the display screen, the curvature (C) of each optical surface on the optical axis, the distance (T) between each surface of the optical axis from the human eye (STOP) to the display screen and the next optical surface, and the even-order aspherical coefficients $\alpha 2$, $\alpha 3$, and $\alpha 4$, wherein the aspherical coefficient can satisfy the following equation.

$$z = \frac{CY^2}{1+\sqrt{1-(1+k)C^2Y^2}} + \sum_{i=2}^{N} \alpha_i Y^{2i}$$

Here, z is the coordinate along the optical axis, Y is the radial coordinate in units of the lens length, C is the curvature (1/R), k is the conic constant, αi is the coefficient of each higher order, and 2i is the order of aspherical coefficient. In the present embodiment, considering the smoothness of the field curvature, there is no higher order spherical coefficient to the 4th order.

TABLE 1

| surface | type | radius (mm) | thickness (mm) | material |
|---|---|---|---|---|
| image surface | standard | infinite | −1500 | |
| STOP | standard | infinite | 13 | |
| fourth surface 222 | aspheric | 171.5876 | 3.498363 | COP |
| third surface 221 | standard | infinite | 0 | |
| polarizing film 60 | aspheric | infinite | 0.2 | PMMA |
| polarization-reflecting film 50 and quarter-wave plate 40 | aspheric | infinite | 0.1 | PMMA |
| second surface 212 | aspheric | infinite | 7.000401 | COC |
| first surface 211 | aspheric | −84.3876 | −7.000401 | MIRROR |
| polarization-reflecting film 50 and quarter-wave plate 40 | aspheric | infinite | −0.1 | PMMA |
| polarization-reflecting film 50 and quarter-wave plate 40 | aspheric | infinite | 0.1 | MIRROR |
| second surface 212 | aspheric | infinite | 7.000401 | COC |
| first surface 211 | aspheric | -84.3876 | 13.70311 | |
| protective surface of the display | standard | infinite | 0.45 | BK7 |

TABLE 1-continued

| surface | type | radius (mm) | thickness (mm) | material |
|---|---|---|---|---|
| light emergent surface of the display | standard | infinite | 0.049861 | |
| object surface | standard | infinite | | |

TABLE 2

| surface | effective aperture size of the lens (mm) | mechanical aperture size of the lens (mm) | Conic Constant | 4th |
|---|---|---|---|---|
| image surface | 3575.261 | 3575.261 | 0 | |
| STOP | 4 | 4 | 0 | |
| fourth surface 222 | 37.5035 | 40.03689 | −9.99939 | |
| third surface 221 | 40.03689 | 40.03689 | 0 | |
| polarizing film 60 | 40.03689 | 44.5 | 0 | |
| polarization-reflecting film 50 and quarter-wave plate 40 | 40.24614 | 44.5 | 0 | |
| second surface 212 | 40.35077 | 44.5 | 0 | |
| first surface 211 | 44.5 | 44.5 | −0.57498 | 2.6222E−07 |
| polarization-reflecting film 50 and quarter-wave plate 40 | 44.5 | 44.5 | 0 | |
| polarization-reflecting film 50 and quarter-wave plate 40 | 44.5 | 44.5 | 0 | |
| second surface 212 | 44.5 | 44.5 | 0 | |
| first surface 211 | 43.89083 | 44.5 | −0.57498 | 2.6222E−07 |
| protective surface of the display | 37.31796 | 37.31796 | 0 | |
| light emergent surface of the display | 37.20089 | 37.31796 | 0 | |
| object surface | 36.98102 | 36.98102 | 0 | |

It should be noted that the thickness in Table 1 refers to the distance from the present optical surface to the next optical surface, wherein a positive value of the thickness refers to a distance in the direction from the display 10 to the human eye 70, and a negative value of the thickness refers to a distance in the direction from the human eye 70 to the display 10. Material means that the optical surface is of this material from that optical surface to the next optical surface; while MIRROR (reflective) does not mean material: instead, it means that the optical surface has a reflective effect. The data represented by the 4th in Table 2 is the 4th order coefficient used to substitution into the formula for calculating the corresponding surface shape.

The above are only the preferred embodiments of the present disclosure, and are not intended to limit the patent scope of the present disclosure. Any equivalent structural transformations made by utilizing the specification of the present disclosure and the accompanying drawings under the concept of the present disclosure or directly/indirectly applying them in other related technical fields are included in the scope of patent protection of the present disclosure.

The invention claimed is:

1. An optical module, comprising:

a display configured for emitting a light for an imaging display in a light-emergent propagation direction;

a glued lens provided in the light-emergent propagation direction, comprising a first lens and a second lens sequentially provided along the light-emergent propagation direction of an optical path, the first lens having a first surface facing the display and a second surface facing away from the display, the second lens having a third surface facing the display and a fourth surface facing away from the display, the second surface and the third surface being planar and glued to each other, and the fourth surface being convex in a direction facing away from the display;

a beam-splitting element provided on a side of the first lens facing the display;

a first quarter-wave plate provided between the first lens and the second lens;

a polarization-reflecting film provided between the first quarter-wave plate and the second lens; and a polarizing film provided on a side of the first lens facing away from the display;

defining a pixel size of the display as P, and a beam diameter of the optical module at a full field of view as D, satisfying: $D<2P$.

2. The optical module of claim 1, wherein the polarizing film is provided between the polarization-reflecting film and the second lens, and the first quarter-wave plate, the polarization-reflecting film, and the polarizing film are combined into an integral film layer.

3. The optical module of claim 1, further comprising:

a second quarter-wave plate provided on a side of the polarization-reflecting film facing away from the display.

4. The optical module of claim 3, wherein the second quarter-wave plate is provided between the polarization-reflecting film and the second lens; or the second quarter-wave plate is provided on the fourth surface of the second lens.

5. The optical module of claim 1, wherein the first surface is convex toward the display.

6. The optical module of claim 1, further comprising:

an anti-reflection film provided on the fourth surface.

7. The optical module of claim 1, wherein the first lens has a center thickness of T1, the second lens has a center thickness of T2, and a distance between the first surface and a light-emergent surface of the display is L, satisfying:

$$4\text{ mm}<T1<8\text{ mm},\ 3\text{ mm}<T2<5\text{ mm},\ 10\text{ mm}<L<15\text{ mm}.$$

8. The optical module of claim 1, wherein the first surface has a radius value of R1, the first surface has a conic constant of C1, the fourth surface has a radius value of R4, and the fourth surface has a conic constant of C4, satisfying:

$$60\text{ mm}<R1<100\text{ mm}, C1<10;$$

$$120\text{ mm}<R4<200\text{ mm}, C4<10.$$

9. A head mount display, comprising:

a housing; and an optical module of claim 1, which is provided in the housing and has an overall optical length of TTL satisfying: $TTL<25$ mm.

* * * * *